UNITED STATES PATENT OFFICE 2,373,198

ALUMINUM SOLUTIONS AND PREPARATIONS

Victor H. Roehrich, St. Paul, Minn.

No Drawing. Application June 5, 1940,
Serial No. 338,913

5 Claims. (Cl. 252—317)

My invention relates to solutions and preparations of aluminum, which, I believe, have unique properties.

I have discovered that neutral magnesium sulphate produces unusual effects when added to many preparations containing aluminum hydroxide plus acids or plus aluminum salts making it easily possible to obtain novel preparations, particularly solutions or sols and jellies unusually rich in aluminum hydroxide and correspondingly low in acid content and therefore of special value for many purposes.

In order to clarify my specification and claims, the following conventions are adhered to throughout: The double formula of aluminum is used; thus aluminum hydroxide is taken to be $Al_2(OH)_6$ and all other compounds of aluminum are also taken to contain two atoms of aluminum $Al_2$, to the molecule, even when theory might make a different number of aluminum atoms preferable. Also, one equivalent of any acid is taken to be the quantity of that acid which furnishes exactly sufficient replaceable hydrogen or hydrogen ion not otherwise neutralized, to correspond with just one hydroxyl on every molecule of aluminum hydroxide present. The hydrogen ions are not necessarily in combination with the corresponding hydroxyl groups as water, and the aluminum salt is not necessarily ionized. (Because of the feeble basic character of aluminum in aqueous conditions, normal aluminum chloride for example is more or less hydrolysed to $Al_2(OH)_6$ plus 6 HCl.) Thus the normal aluminum salts are taken to have six acid equivalents, and the fifty percent basic aluminum sulphate, $Al_2(OH)_3(SO_4)_{1\frac{1}{2}}$, is taken to have 3 equivalents of sulphuric acid. Also, since all of the preparations claimed as novel contain neutral magnesium sulphate, the number of molecules of this salt, $MgSO_4$, specified, means the number present to each two atoms of aluminum. Finally, all solutions, sols, jels, or jellies hereafter referred to are aqueous and the mols per liter when stated refer to mols of aluminum preparation per liter.

With the exception of the pure colloidal solutions of aluminum hydroxide and the solution of colloidal aluminum acetate described in the Journal of the American Chemical Society, 1913, page 1490, all of which are very sensitive toward electrolytes, apparently no solutions of aluminum hydroxide with less than three equivalents of acid have been prepared or described heretofore, doubtless because hydrolysis immediately precipitates excess aluminum hydroxide. However, I have found that with one and one-half molecules of magnesium sulphate present, stable solutions of aluminum hydroxide can be prepared with only two equivalents of sulphuric acid which may be conventionally represented as $Al_2(OH)_4SO_4$. This solution can be heated or stored without precipitation. When concentrated, the solution becomes syrupy, suggesting a colloidal condition. When dried, the residue can be stored and it can be redissolved, becoming homogeneous. Other acids than sulphuric acid can be employed using two to three equivalents of acid, with similar results.

Because of the characteristics of the novel soluble preparations of aluminum hydroxide with only two to three equivalents of acid in the presence of approximately from one third molecule up to three molecules of magnesium sulphate, these preparations may be conveniently described as activated aluminum hydroxide. The term, activated aluminum hydroxide, will be used as defined above, in this application.

Activated aluminum hydroxide has been prepared by me, using one and one-half molecules of magnesium sulphate and two equivalents of lactic, tartaric or citric acid producing solutions very similar to that produced by using two equivalents of sulphuric acid. However, no solutions have been produced when less than two equivalents of the above mentioned acids are used, the aluminum hydroxide being then precipitated throughout the liquid as solid white jel. This is also the case when less than about 2.4 equivalents of hydrochloric acid are used, but with 2.4 equivalents of hydrochloric acid stable solutions and soluble dried preparations of activated aluminum hydroxide can be produced.

Solutions of activated aluminum hydroxide can also be produced by employing about 2.4 equivalents of acetic or formic acid. The solution of about one-half mol per liter concentration filters readily when fresh, but in a few hours or a few days, it congeals to a plastic transparent slightly opalescent jelly which retains these characteristics permanently. This is especially true when a small amount of sulphuric acid is also present, about .2 equivalent. On the other hand, the jells of basic aluminum acetate or formate without magnesium sulphate are not stable at room temperature but show syneresis or shinkage with separation of liquid. My activated aluminum hydroxide prepared with acetic or formic acid because of the low acid content has very much less odor of acid and yet is more astringent than the solutions of basic acetate and formate of aluminum heretofore prepared. The former can be carefully dried whereupon they exfoliate to bulky white powder which can again be dissolved and then again changes to a smooth transparent opalescent jelly.

By careful proportioning, stable jellies of activated aluminum hydroxide can also be prepared using about $2\tfrac{1}{8}$ equivalents of sulphuric acid and one-half molecule of magnesium sulphate. In a solution of about one-half mol per liter concentration, this forms a clear sol which forms a clear jelly in some hours.

A clear jelly of activated aluminum hydroxide has been prepared by using $2\tfrac{1}{8}$ equivalents of hydrochloric acid and $\tfrac{1}{8}$ equivalent of sulphuric acid in the presence of about $\tfrac{1}{3}$ molecule of magnesium sulphate. This jelly of about one-half mol per liter concentration becomes liquid as evaporation concentrates it and again jellies when diluted. When dried it can be redissolved and again forms a clear jelly as before.

I have prepared a large number of activated aluminum hydroxide preparations using mixed acids of two or more different kinds. In the case of mixed acids being used those acids previously mentioned may be mixed. Furthermore, about one and one-half equivalents of any of these acids may be used together with about one equivalent of boric, glycolic, propionic, or maleic acid to give a total of $2\tfrac{1}{2}$ acid equivalents even though the last four acids when used alone do not form satisfactory solutions or jellies.

When one volume of solution of activated aluminum hydroxide of about one-half mol per liter concentration is diluted with nine volumes of water at room temperature, the entire liquid is instantly changed to opaque white by the heavy precipitate of the activated aluminum hydroxide and tests show that about two thirds of the aluminum is now present in the precipitate which slowly settles out, leaving the top half of the liquid clear. This precipitate of activated aluminum hydroxide is an excellent adsorbing agent for dissolved color and useful for clarifying solutions or forming lake colors. It is produced in about twice the amount of the precipitate of aluminum hydroxide from the most basic ordinary salt of aluminum, namely fifty percent basic aluminum sulphate, when a half molal solution of the latter is likewise diluted with nine volumes of water at room temperature. When a thirty-three and one-third percent basic sulphate of aluminum is likewise diluted from one-half mol per liter to one-twentieth mol per liter at room temperature, no precipitate appears until about one-half hour standing and then relatively much less than in the previously described cases. Again, thirty-three and one-third percent basic chloride of aluminum which is about the most basic chloride which can be produced, does not precipitate any aluminum hydroxide when diluted from one-half mol per liter to one-twentieth mol per liter and the same is true of ordinary soluble basic acetate of aluminum. An important point seems to be that when either the basic chloride or basic acetate is diluted in the same way as above but using water containing one and one-half molecules of magnesium sulphate per two atoms of aluminum to be added, then the hydrolysis is activated and there is an immediate heavy precipitate of aluminum hydroxide but not in as large amount as produced by my activated aluminum hydroxide prepared as before defined. Because my activated aluminum hydroxide preparations hydrolyse to form a precipitate instantly and in a larger amount than ordinary aluminum preparations, they are especially active in mordanting, tanning, and other reactions which depend on the hydrolysis and adsorption effects of aluminum solutions, and apparently for the same reason my preparations exhibit stronger astringent properties than the corresponding solutions without magnesium sulphate but containing a larger proportion of acid.

While the precipitation of basic chloride acetate or formate of aluminum upon dilution is activated by magnesium sulphate in moderate amount, a larger amount of magnesium sulphate as for instance a seven or ten percent solution used in place of water as the diluent, greatly delays or even prevents the precipitation of any aluminum hydroxide from many aluminum preparations which would precipitate if diluted with pure water.

Doubtless the hydrogen ion concentration is more important in maintaining the aluminum hydroxide in solution, than the kind of acid used because, as already stated, upon dilution my activated aluminum hydroxide at once hydrolyses out indicating little or no bond between the aluminum hydroxide and the acid. Furthermore, aluminum hydroxide can itself act as an acid, hence low basicity.

My solutions can be considered as an aqueous system composed of aluminum hydroxide, hydrogen ion and magnesium sulphate, the last because of its water binding properties acting in a manner not clearly understood to prevent the precipitation of the aluminum until considerably diluted. The fact that acetic acid in water alone is one of the least ionized acids tested and that it forms jellies most readily when used in my activated aluminum hydroxide solutions or sols suggests that possibly there is here a lack of hydrogen ions and this allows an incipient precipitation of the activated aluminum hydroxide forming the transparent opalescent jelly. The jellies are thixatropic, i. e., can be shaken or stirred to liquid and then reset to jelly repeatedly which may be due to a reversibility of the incipient precipitate. This may account for their very plastic or unctuous character. The attractive jelly structure of some of my activated aluminum hydroxide preparations is no doubt due to aluminum hydroxide which is on the threshold between solubility and insolubility.

My activated aluminum hydroxide preparations are not affected by addition of considerable amount of sodium sulphate and incidentally it may be stated that efforts to produce solutions or jellies using sulphates of sodium potassium or ammonium in place of magnesium have not given satisfactory results as the products exhibit syneresis and become opaque. Urea has not been found of value in formation of activated aluminum hydroxide preparations when substituted for magnesium sulphate.

Because of the similarity in properties of the various activated aluminum hydroxide preparations that I have described and because of the character of their properties, the term "activated aluminum hydroxide" applied to them appears to be suitable.

The methods of preparation of the solutions of activated aluminum hydroxide are simple and obvious. It merely appears necessary to state that the solutions are produced by interchange reactions by combining the correct quantities of aluminum sulphate or fifty percent basic aluminum sulphate, fresh soluble washed aluminum hydroxide or hydroxide-carbonate, the various acids required or the corresponding normal aluminum salts of these acids together with magnesium sulphate. Furthermore, magnesium oxide or carbonate may be used from which magnesium sulphate will be produced by interaction with aluminum sulphate.

Instead of at least part of the oxide or carbonate, the magnesium salt of the acid desired may be used in correct proportion. The solutions are best produced by slow interaction with very careful heating if necessary. Those solutions which form jelly readily are best finished while cool. The solid preparations are obtained by drying the corresponding solutions or jellies. In the case of the acetate or formate preparations, because these lose volatile acid while drying, an excess of acid may be used so that the desired amount of acid will remain in the dry product.

It may therefore be desirable to add magnesium sulphate even to normal acetate or formate or to the respective basic salts of four acid equivalents to permit easier preparation of soluble dry preparations of a less number of acid equivalents. The addition of magnesium sulphate to the above mentioned basic salts will also enhance their astringent and hydrolysing properties as has been already shown, and the same will also be true of some of the other ordinary aluminum salts such as the basic chloride and sulphate.

Two specific formulas are given as examples as follows:

*First example.*—One half mol of 100% aluminum sulphate, $Al_2(SO_4)_3 18H_2O$, or 333 gms. is neutralized with the equivalent amount of sodium carbonate and washed with water and filtered. The moist product or one-half mol of aluminum hydroxide-carbonate is mixed with a second 333 gms. of aluminum sulphate and 122 gms. of 90% formic acid (2.4 equivalents) and 150 ml. of water. When the mixture is all in solution, warming gently if necessary and cooling again, a slurry of 140 gms. magnesium carbonate 84⅓%, (100 gms. is 1 mol) in 533 ml. of water is mixed into solution. When the solution is complete, a clear solution results which may be further clarified by filtering and then forms a jelly in one or two days. It contains ⅕ equivalent of sulphuric acid. It may contain a small amount of sodium sulphate not completely washed out of the aluminum hydroxide-carbonate.

*Second example.*—⅔ mol of moist aluminum hydroxide-carbonate is mixed with ⅓ mol 222 gms. of aluminum sulphate, $Al_2(SO_4)_3 18H_2O$, and 370 gms. of magnesium sulphate, $MgSO_4 7H_2O$, and 670 ml. of water is added. The mixture is warmed gently and is dissolved after twenty-four hours at room temperature, forming a permanent sol or solution which may be filtered.

The use of my activated aluminum hydroxide preparations as well as the mixtures of magnesium sulphate with normal and ordinary basic salts obviously have certain advantages over the use of the previously known aluminum salts whenever the presence of magnesium sulphate does not interfere with the use intended or where the magnesium sulphate can later be easily washed out of fibres, fabrics, leather, or precipitated lake colors without removing the precipitated aluminum.

The advantage of a low relative acid content in my activated aluminum hydroxide reduces corrosion tendencies in the metal for handling the preparations, reduces attack on fibres with which it comes in contact and also on leather tanned with these preparations. For the same reason, these preparations are less irritating to living skin or mucous membrane. This is important especially because activated aluminum hydroxide preparations are very effective in checking underarm perspiration and deodorizing.

The low acid content as compared to the high aluminum content can be a great advantage in cases where fabrics are heat treated as by steaming. The plastic texture and relatively high astringency of the activated aluminum hydroxide in jelly form makes it suitable for drug and cosmetic purposes alone or in creams, where it may be mixed with many creaming agents such as for instance the esters of polyhydroxy alcohols especially fatty mono esters of glycerine and diethylene glycol as used in United States Patent No. 2,145,583. The sols and solutions are also suitable for drug and cosmetic purposes and may be incorporated in liquids, creams, sticks, or ice.

In using the term "soluble" in the specification and claims, I desire to define this word as meaning capable of going into solution either as a true solution or as a colloidal sol and which may remain fluid or change to a permanent transparent opalescent jelly, hence not entirely homogeneous but very nearly so.

The activated aluminum hydroxide in jelly form may also be used in printing mordant compositions for textiles because of its desirable plastic and other properties.

In accordance with the patent statutes, I have described the aluminum containing products which I have discovered and the method of preparing the same; and while I have endeavored to set forth the best embodiments thereof, I desire to have it understood that these are only illustrative of a means of carrying out my invention, and that obvious changes may be made within the scope of the following claims without departing from the spirit of my invention.

I claim:

1. An activated aluminum hydroxide including over one-third molecule of magnesium sulphate for each two atoms of aluminum, and an acid, said acid being present in a quantity of two to three equivalents.

2. A soluble composition of matter comprising as essential ingredients, aluminum hydroxide, magnesium sulphate in a quantity of over one-third molecule per two atoms of aluminum, and acid in a quantity of two to three equivalents.

3. A jelly of activated aluminum hydroxide containing over one-third molecule of magnesium sulphate per two atoms of aluminum and two to three equivalents of acid.

4. A solid preparation comprising the dried product of activated aluminum hydroxide containing over one-third molecule of magnesium sulphate per two atoms of aluminum and two to three equivalents of acid.

5. A colloidal sol of aluminum hydroxide containing at least ⅓ molecule of magnesium sulphate per two atoms of aluminum and two to three equivalents of acid.

VICTOR H. ROEHRICH.